(12) United States Patent
Scholz

(10) Patent No.: US 6,463,025 B1
(45) Date of Patent: *Oct. 8, 2002

(54) DISK RECORDER OR PLAYER FOR AUTOMATIC FRONT SIDE INSERTION AND EJECTION OF DISKS

(75) Inventor: Thomas Scholz, Waldernbach (DE)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/642,176

(22) Filed: May 6, 1996

(30) Foreign Application Priority Data

May 6, 1995 (DE) .......................... 195 16 733

(51) Int. Cl.[7] .............................................. G11B 33/02
(52) U.S. Cl. .................................................. 369/77.1
(58) Field of Search ............................ 369/77.1, 75.1, 369/77.2, 75.2, 36, 38; 360/99.02, 99.03, 99.06, 99.07

(56) References Cited

U.S. PATENT DOCUMENTS

| | | | | |
|---|---|---|---|---|
| 4,498,162 A | * | 2/1985 | Schatteman | 369/77.1 |
| 4,682,320 A | * | 7/1987 | d'Alayer de Costemore d'Arc | 369/77.1 |
| 4,969,140 A | * | 11/1990 | Koiwa et al. | 369/77.1 |
| 4,979,160 A | * | 12/1990 | Araki | 369/75.2 |
| 5,056,077 A | * | 10/1991 | Morikawa et al. | 369/77.1 |
| 5,163,040 A | | 11/1992 | Hake | 369/204 |
| 5,255,255 A | * | 10/1993 | Kaneda et al. | 369/77.1 |
| 5,260,925 A | * | 11/1993 | Camps et al. | 369/77.1 |
| 5,544,148 A | * | 8/1996 | Nakamichi | 369/192 |
| 5,682,369 A | * | 10/1997 | Nakamichi | 369/75.2 |
| 5,886,968 A | * | 3/1999 | Nakamichi | 369/77.1 |
| 6,028,831 A | * | 2/2000 | Scholz et al. | 369/75.2 |

FOREIGN PATENT DOCUMENTS

JP        02047893        3/1987

* cited by examiner

Primary Examiner—Brian E. Miller
(74) Attorney, Agent, or Firm—Michael E. Belk

(57) ABSTRACT

A loading mechanism for an apparatus for recording or reproducing information using an information disc, which mechanism includes guides for the disc edge. The guides include a supporting guide constructed as a support for the disc edge pressed against it and a loading guide constructed as a rotationally drivable transport wheel, which rolls the information disc into and out of the apparatus for the purpose of loading and unloading, respectively, the supporting guide and the loading guide guiding the information disc along a loading path. The loading mechanism has minimal dimensions and enables the information disc to be loaded and unloaded without the surface of the disc being touched. This is achieved by the supporting guide and the loading guide being supported so as to be movable in a loading plane.

21 Claims, 12 Drawing Sheets

DISK RECORDER OR PLAYER FOR AUTOMATIC FRONT SIDE INSERTION AND EJECTION OF DISKS

BACKGROUND OF THE INVENTION

Field of the Invention

The invention relates to the field of mechanisms for loading and unloading disk-shaped record carriers in decks of information recording or reproducing equipment.

The invention relates to a loading mechanism for an apparatus for recording and/or reproducing information on/from an information disc, which mechanism includes guides for the disc edge. The guides include a supporting guide constructed as a support for the disc edge pressed against it and a loading guide constructed as a rotationally drivable transport wheel which rolls the information disc into and out of the apparatus for the purpose of loading and unloading, respectively. The supporting guide and the loading guide guide the information disc along a loading path.

Such a device is known from U.S. Pat. No. 5,163,040. The information disc is introduced into the apparatus through a slot. In the apparatus the information disc is guided at one side by a rigid curved and grooved guide member as a supporting guide and at the other side it is guided by a grooved rubber roller as a loading guide. The rubber roller can be driven by a motor. To introduce the information disc into the apparatus it is manually inserted into the slot of the apparatus and brought into engagement with the grooves of the supporting guide and the loading guide. Subsequently, the motor is started either by means of a manually actuated switch or by means of a detection member, which detects the information disc engaging the groove of the supporting guide and the groove of the loading guide. The rubber roller of the loading guide is motor driven during the loading process and rolls the information disc between itself and the supporting guide along a curved loading path in the apparatus.

However, a construction of this kind has several disadvantages. Owing to the use of the curved supporting guide, the information disc can be introduced into the apparatus only along a curved loading path, insertion along a straight path, however, being impossible. As compared with straight-line insertion of the information disc it requires a larger width of the loading mechanism and hence of the apparatus. Particularly for automotive uses this is a considerable drawback, because the room available for mounting of the apparatus is then limited.

The round information discs have a central positioning hole. In order to treat the disc surface with care, it is advantageous if a user touches the information disc only at the edge of the positioning hole and at the periphery of the information disc. In the known arrangement the center of the information disc must be inserted by hand up to at least the location of the center of the rubber roller of the loading guide into the position referred to below as the intermediate position, before the loading mechanism automatically takes over the insertion of the information disc. In this intermediate position the positioning hole is no longer situated outside the housing front and the user cannot hold the information disc in the desired manner at the edge of the positioning hole and at the periphery of the information disc. As a result, the user is forced to touch the information-disc surface in order to bring the information disc into the intermediate position. This results in increased wear of the information discs. The above citation is hereby incorporated in whole by reference.

SUMMARY OF THE INVENTION

It is an object of the invention to provide a loading mechanism of the type defined in the opening paragraph, which has minimal dimensions and which enables the information disc to be loaded and unloaded without the surface of said disc being touched.

According to the invention this object is achieved in that the supporting guide and the loading guide are supported so as to be movable in a loading plane.

The movability of the supporting guide and the loading guide allows these guides to move in accordance with the outline of the information disc and thus guide the disc edge of the information disc in a flexible manner. This enables the information disc to be loaded along substantially arbitrarily definable loading paths. Information discs not having a circular disc edge (for example having oval or other disc edges) can also be rolled into the apparatus by means of such a loading mechanism. A variety of constructions can be envisaged in order to obtain the movability of the supporting guide and the loading guide. For example, the supporting guide and the loading guide can be guided in grooves and can be urged against the disc edge in these grooves by spring force or by means of actuators.

The guides engage with the information disc at its edges only, whereas these guides remain clear of the signal-storage surface of the information disc. This precludes possible damage to the signal-storage surface.

In the intermediate position, into which the information disc is inserted by the user and from which the information disc is automatically rolled inward by the loading mechanism, the positioning hole of the information disc is situated outside the housing front. As a result of this, the user can bring the information disc by hand into the intermediate position in such a way that the hand of the user only touches said disc at the inner edge of the positioning hole of the information disc and at the periphery of the information disc. This precludes damage to the surface of the information disc by contact with the hand of the user. It is also possible to remove the information disc in the same way from the apparatus in an eject position. In the eject position the supporting guide and the loading guide also engage with the disc edge of the information disc and the information disc is held in a stable manner by the supporting guide and the loading guide, so as to prevent the information disc from inadvertendy rolling out of the apparatus. The loading mechanism can be constructed in such a manner that the information disc projects from the front of the housing over approximately 85% of its diameter.

A further advantageous embodiment of the invention is characterized in that the supporting guide and the loading guide are carried by pivotal arms which are supported at one end.

This is a particularly advantageous and low cost possibility of realizing the movability of the supporting guide and the loading guide. By arranging the guides on pivotal arms these guides can be pivoted in accordance with the outline of the information disc.

A further advantageous embodiment of the invention is characterized in that the supporting guide and the loading guide guide the information disc along a substantially rectilinear loading path during loading and unloading.

As a result of the straight-line insertion movement of the information disc the width required for the loading mechanism is essentially determined by the diameter of the information disc and the housing of the loading mechanism can be made correspondingly small. Particularly for automotive uses this is a great advantage, because the room available for mounting of the apparatus is then limited.

A further advantageous embodiment of the invention is characterized in that the two pivotal arms are each pretensioned towards the center of the loading plane.

The supporting guide and the loading guide arranged on the pivotal arms are urged against the disc edge by the pretension of the pivotal arms and can thus guide the disc edge in a flexible manner during loading and unloading of the information disc.

A further advantageous embodiment of the invention is characterized in that the pivotal arms are coupled to one another.

A further advantageous embodiment of the invention is characterized in that the two pivotal arms are coupled by means of a tension spring acting between the two pivotal arms.

A tension spring is a constructionally simple possibility of urging the ends of the pivotal arms towards one another.

A further advantageous embodiment of the invention is characterized in that the pivotal arms are coupled by a coupling rod, and at least one of the pivotal arms is retensioned towards the center of the loading plane.

The supporting guide and the loading guide arranged on the pivotal arms are urged against the disc edge by the pretension of at least one of the pivotal arms. The pivotal arm which is pretensioned towards a central point of the mechanism in the loading plane acts upon the non-pretensioned pivotal arm by means of the coupling rod, in such a manner that the latter is also subject to a force towards the center of the loading plane. Obviously, it is also possible to pretension both pivotal arms towards the center of the loading plane.

A further advantageous embodiment of the invention is characterized in that the coupling rod has at least two longitudinal grooves which are each engaged by a pivotal-arm pin mounted on the pivotal arm, and the coupling rod has at least one coupling-rod pin which engages a housing-cover groove which extends in a housing cover in the direction of the rectilinear loading path.

This construction ensures that the coupling rod moves along the straight-line loading path. As a result, the two pivotal arms are pivoted symmetrically and the supporting guide and the loading guide guide the information disc along the straight-line loading path during loading and unloading.

A further advantageous embodiment of the invention is characterized in that the supporting guide takes the form of a rotationally drivable transport wheel.

The rotatable construction of the supporting guide makes it possible to insert and remove the information disc into/from the apparatus without the information disc itself being rotated. If the transport wheel of the supporting guide and the transport wheel of the loading guide are grooved, the information disc will be moved into and out of the apparatus without rotation of the disc itself if the groove diameter of the transport wheel of the supporting guide and the transport wheel of the loading guide is the same and the transport wheel of the supporting guide and the transport wheel of the loading guide rotate with the same speed in opposite directions of rotation.

A further advantageous embodiment of the invention is characterized in that the transport wheel has a groove in which the disc edge of the information disc is engageable.

A further advantageous embodiment of the invention is characterized in that the supporting guide has a groove in which the disc edge of the information disc is engageable.

A groove is a particularly simple possibility of guiding the disc edge.

A further advantageous embodiment of the invention is characterized in that the transport wheel comprises a supporting surface adapted to support one side of the disc edge of the information disc, the transport wheel has a contact edge against which the edge of the information disc can be pressed, and there has been provided a pressure element adapted to be pressed against the other side of the disc edge of the information disc.

Such a construction enables a large holding force in a direction perpendicular to the loading plane to be applied to the disc surface at the location of the disc edge of the information disc. This is particularly important in an eject position, in which the information disc projects farthest from the housing and the information disc must be held only by means of the supporting guide and the loading guide to allow it to be removed by the user.

A further advantageous embodiment of the invention is characterized in that the supporting guide comprises a supporting surface adapted to support one side of the disc edge of the information disc, the supporting guide has a contact edge against which the edge of the information disc can be pressed, and there has been provided a pressure element adapted to be pressed against the other side of the disc edge of the information disc.

A further advantageous embodiment of the invention is characterized in that there has been provided an auxiliary guide which enables the disc edge of the information disc to be additionally guided in an intermediate stage of the loading process.

The auxiliary guide prevents the information disc from being tilted relative to the loading plane. The auxiliary guide is no longer operative in a final stage of the loading operation, so that the information disc can be lowered onto a turntable.

The loading mechanism is preferably used in a deck, in an apparatus for recording and/or reproducing of information on/from an information disc by means of a deck, and in a car radio comprising a deck.

Those skilled in the art will understand the invention and additional objects and advantages of the invention by studying the description of preferred embodiments below with reference to the following drawings which illustrate the features of the appended claims:

BRIEF DESCRIPTION OF THE DRAWINGS

Some embodiments of the invention will be described in more detail hereinafter, by way of examples, with reference to FIGS. 1 to 13, in which.

DESCRIPTION OF THE PREFERRED EMBODIMENTS

Figure 1:
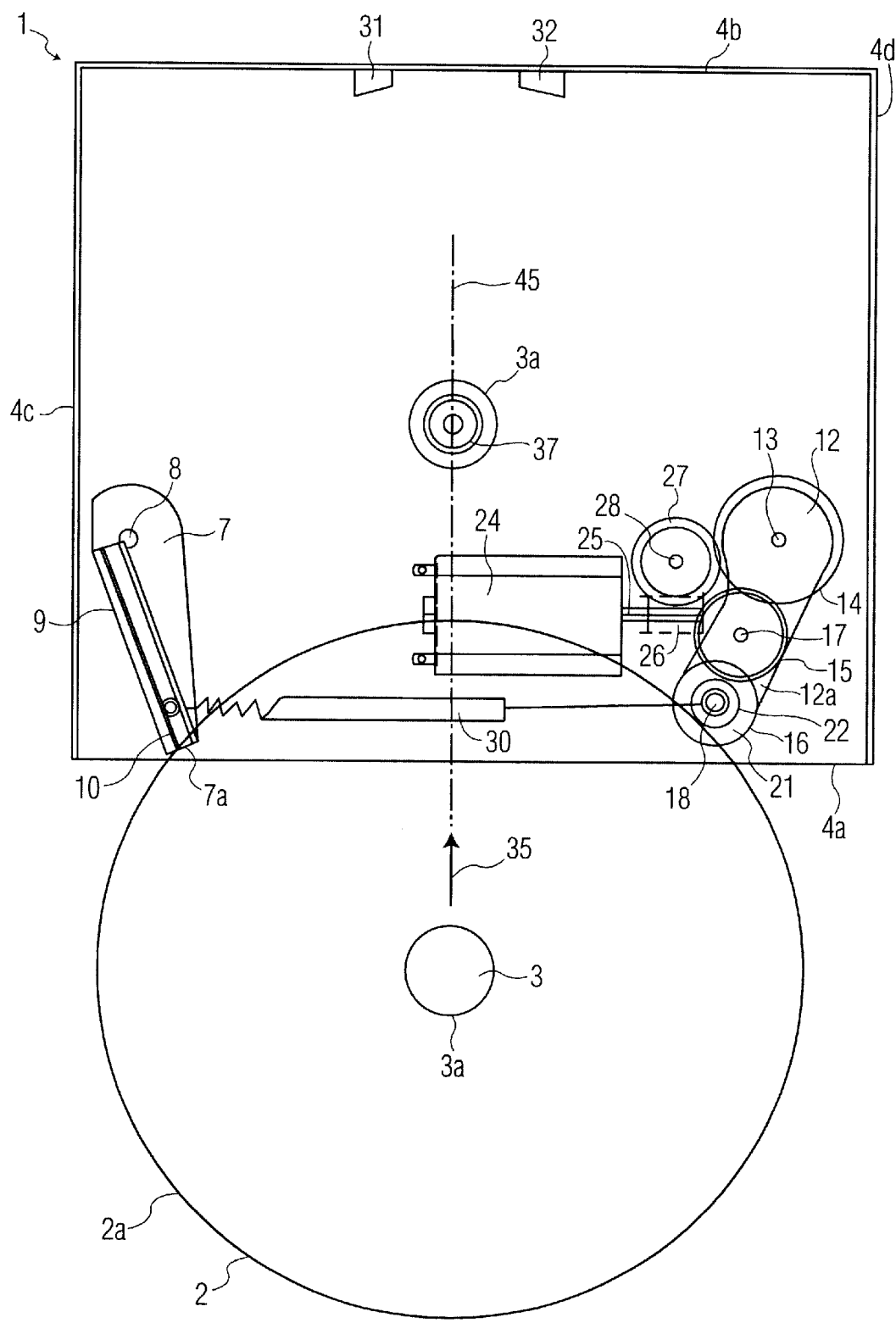
FIG. 1 shows as a first embodiment the loading mechanism of an apparatus for recording and/or reproducing information on/from an information disc in a plan view, the loading mechanism having pivotal arms carrying guides for the edges of the information disc and being shown in an eject position in which the information disc is held in a stable manner by the guides and can be removed by hand by a user.
Figure 4:
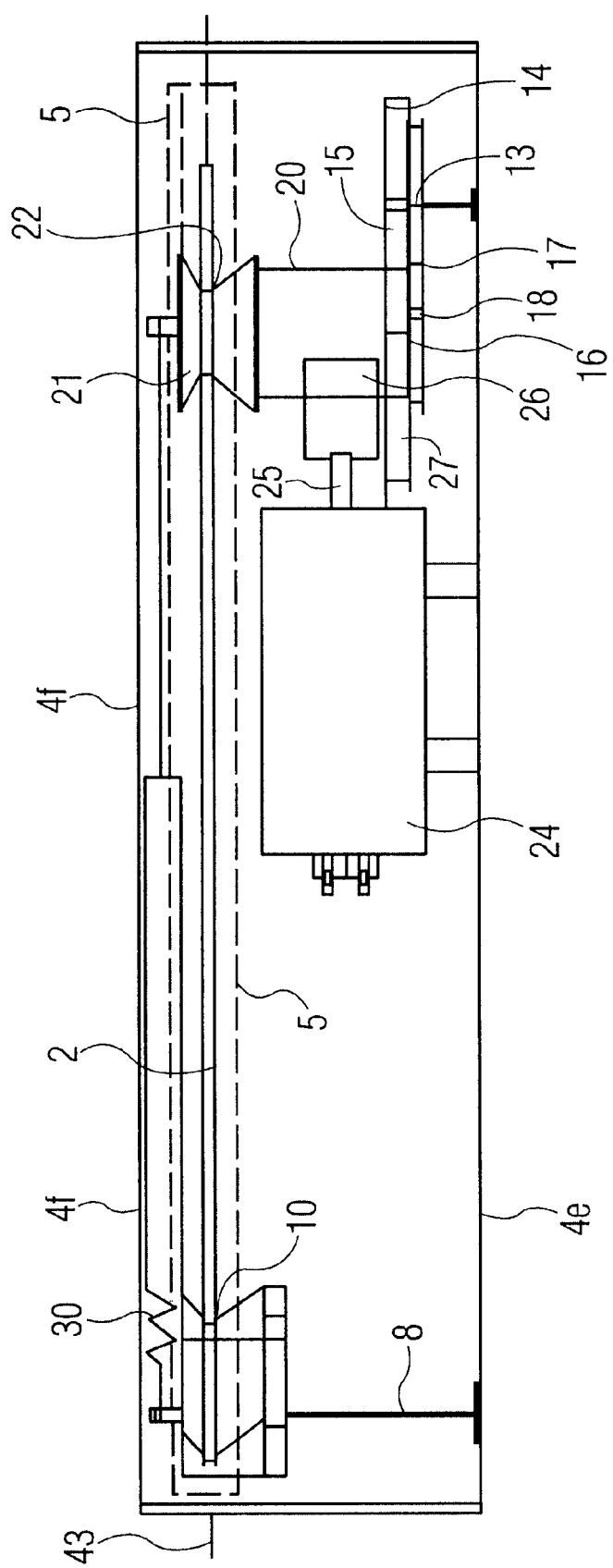
FIG. 4 is a front view of the loading mechanism shown in FIG. 3.

A first embodiment of a loading mechanism of an apparatus for recording and/or reproducing signals/information shown in FIG. 1 is accommodated in a housing 1. The loading mechanism serves for loading/unloading an information disc 2 which stores the signals/information. The information disc 2 has a circular edge 2a and has a circular positioning hole 3 with an edge 3a. The housing 1 has a front wall 4a, a rear wall 4b and side walls 4c and 4d. As is shown in FIG. 4, the housing comprises a bottom plate 4e and a cover plate 4f. The front wall 4a has a loading slot 5, visible in FIG. 4, through which the information disc 2 can be inserted. As is shown in FIG. 1, a pivotal spindle 8 is mounted on the bottom plate 4e in the proximity of the side wall 4c, about which spindle a first pivotal arm 7 is pivotable. The pivotal arm 7 carries a supporting guide 9 having a groove 10. The supporting guide 9 can, for example, be made of rubber. A further pivotal spindle 13 is mounted on the bottom plate 4e in the proximity of the side wall 4d, about which spindle a second pivotal arm 12 is pivotable. The pivotal arm 12 carries three toothed wheels 14, 15 and 16 which mesh with one another. The toothed wheel 14 is rotatably journaled on the spindle 13. The toothed wheels 15 and 16 are journaled on spindles 17 and 18 mounted on the pivotal arm 12. In FIG. 4a transport wheel in the form of a rubber roller 21 is connected to the toothed wheel 16 by a connecting member 20. The rubber roller 21 has a groove 22. The groove 22 of the rubber roller 21 and the groove 10 of the supporting guide 9 extend in a loading plane 43. The rubber roller 21 may also consist of another material.

A motor 24, whose shaft 25 carries a worm 26, is mounted on the bottom plate 4e of the housing 1. The motor 24 can be driven in two directions. By means of the worm 26 a toothed wheel 27 can be driven, which toothed wheel is rotatably mounted on a spindle 28 carried by the bottom plate 4e. The toothed wheel 27 is in mesh with the toothed wheel 14. Thus, the rubber roller 21 can be driven in two directions by means of the motor 24, the shaft 25, the worm 26 and the toothed wheels 27, 14, 15 and 16.

The free ends 7a and 12a of the pivotal arm 7 and the pivotal arm 12 are connected to one another by means of a tension spring 30, as a result of which a force directed towards the center of the housing 1 is exerted on the free ends 7a and 12a of the pivotal arms 7 and 12.

Moreover, two stops 31 and 32 are disposed on the rear wall 4b of the housing 1 at the level of the loading plane 43.

The insertion of the information disc 2 into the housing 1 will now be explained with reference to FIGS. 1 to 4.

When the information disc 2 is to be loaded into an apparatus, a user holds the information disc 2 at the edge 3a of the positioning hole 3 and at the periphery 2a of the information disc 2. The information disc 2 thus held is inserted into the grooves 10 and 22 of the supporting guide 9 and the rubber roller 21 through the slot 5 in the front wall 4a of the housing 1. This position of the information disc 2 is shown in FIG. 1 and is referred to as the eject position. The user then moves the information disc 2 by hand in the direction indicated by an arrow 35 into a position referred to hereinafter as the intermediate position over a length indicated by 36 in FIG. 1. This length is of the order of magnitude of 40 mm, i.e. approximately ⅓ of the diameter of the information disc, but other lengths are also possible. The information disc 2 is then laterally guided by the groove 10 of the supporting guide 9 at one side and by the groove 22 of the rubber roller 21 at the other side, the surface of the information disc 2 not being touched by the user's hand. The pivotal arm 12 is then pivoted about the spindle 13 and the pivotal arm 7 about the spindle 8. The pivoting angle is determined by the outline of the information disc 2.

Figure 2:
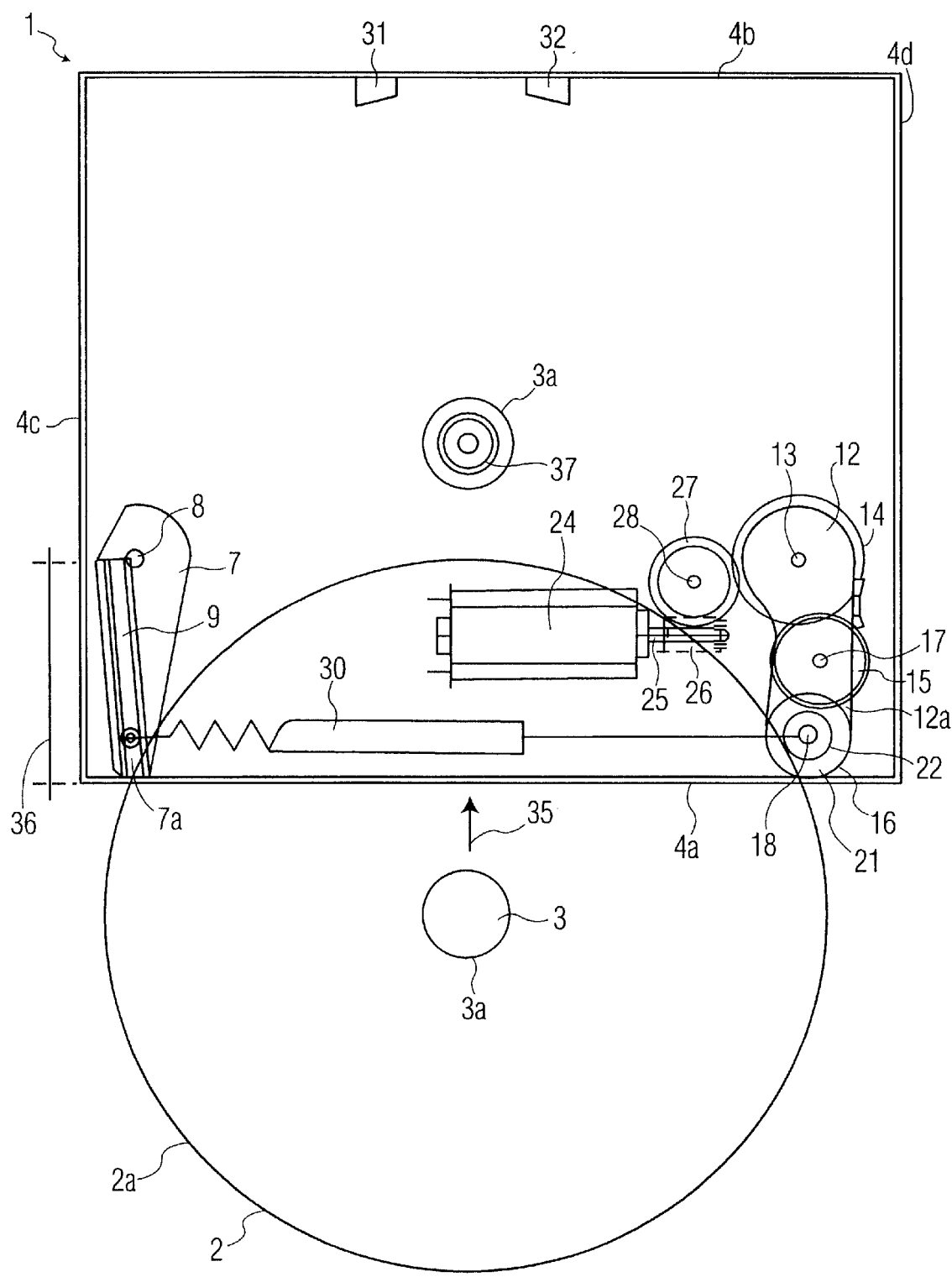
FIG. 2 shows the loading mechanism of FIG. 1 in an intermediate position in which the user has inserted the information disc up to a point at which the loading mechanism automatically takes over the further insertion of the information disc.

FIG. 2 shows the position of the information disc 2 in the intermediate position. In this intermediate position the information disc 2 and, consequently, the positioning hole 3, projects from the front 4a of the housing 1 over approximately ⅔ of the diameter of the information disc. As a result of this, the user can also hold the information disc 2 at the edge 3a of the positioning hole 3 and at the periphery 2a of the information disc 2 in this intermediate position.

When the information disc 2 has been inserted into the apparatus up to this intermediate position, the motor 24 is energized via a switch, not shown, and the loading mechanism automatically performs further insertion of the information disc 2.

The switch can be, for example, a mechanical switch or an optical switch (light barrier). It is also possible to start the motor at an earlier instant.

The motor now begins to rotate so as to drive the rubber roller 21 clockwise via the shaft 25, the worm 26, the toothed wheels 27, 14, 15 and 16. The rubber roller 21, which rotates clockwise, then exerts a tangential force on the edge of the information disc 2, as a result of which the information disc 2, which is supported between the supporting guide 9 and the rubber roller 21, is automatically rolled into the housing along a straight loading path 45. The pivotal arm 12 is then pivoted about the spindle 13 and the pivotal arm 7 about the spindle 8.

Figure 3:
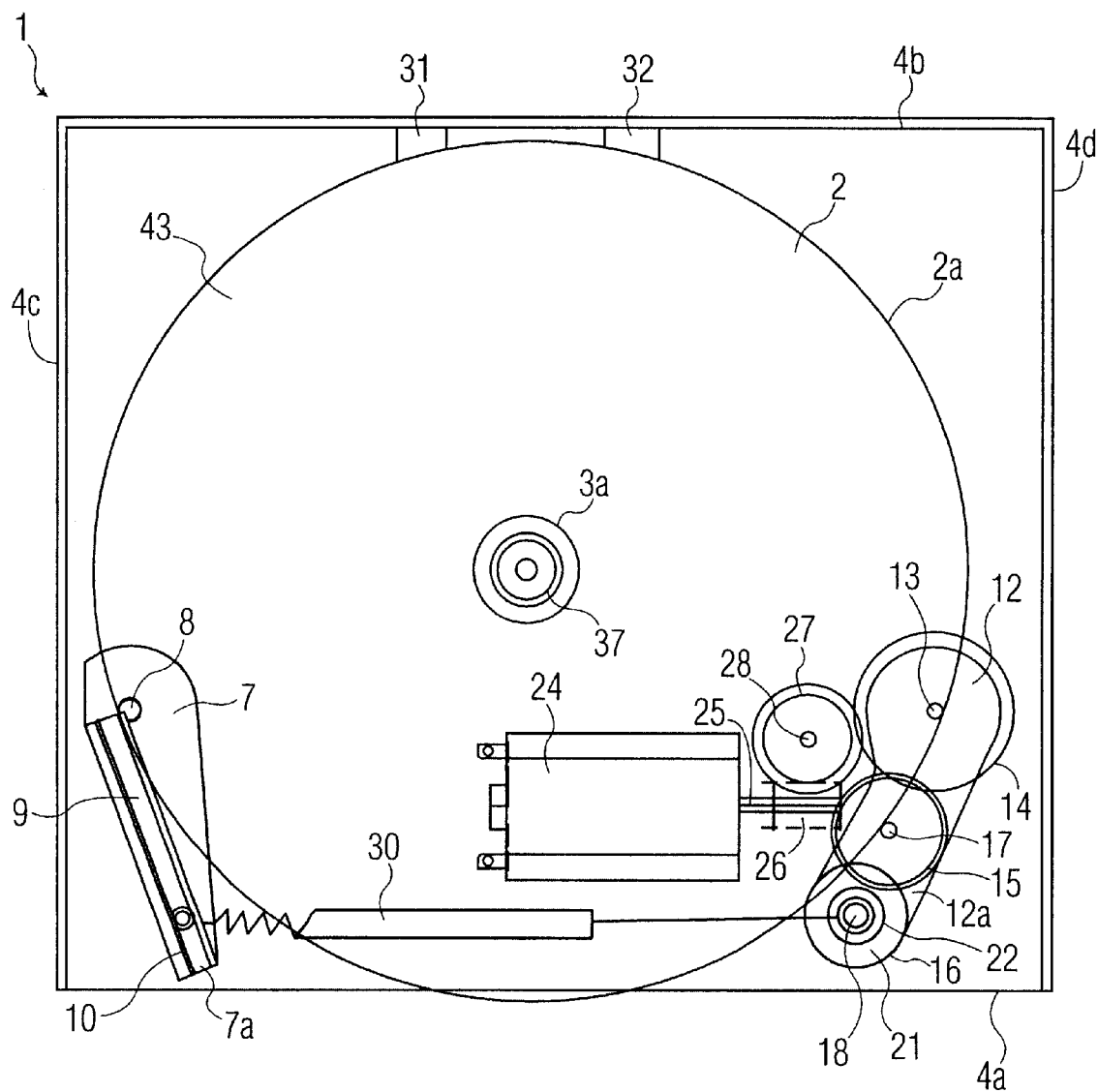
FIG. 3 shows the loading mechanism of FIG. 1 in a roll-in position with an information disc wholly rolled-in in a first loading direction.

The roll-in operation is stopped in that the edge of the information disc 2 abuts against the two stops 31 and 32 arranged on the rear wall 4b of the housing 1. This position of the information disc 2 is shown in FIG. 3 and is referred to hereinafter as the roll-in position. The motor 24 is now switched off by means of a switch, not shown. Again, the switch can be, for example, a mechanical switch or an optical switch (light barrier).

Figure 9:
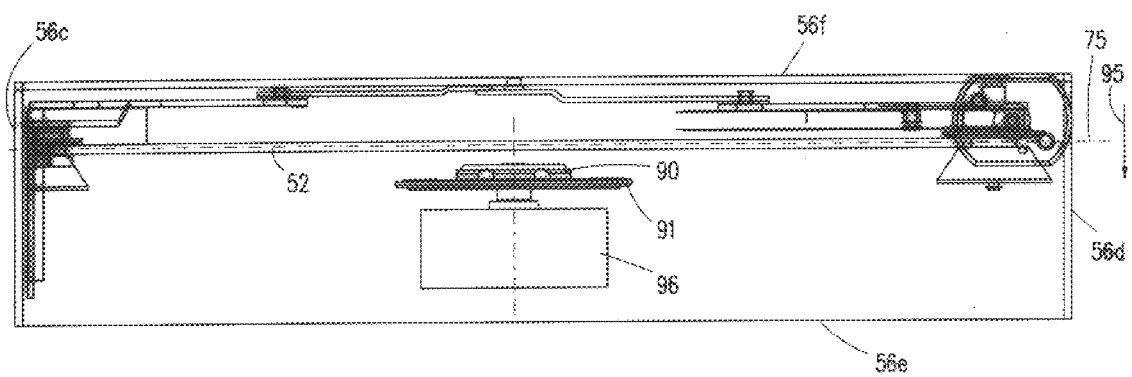
FIG. 9 is a front view of the loading mechanism shown in FIG. 8.

Thus, the automatic roll-in operation of the information disc has ended and a positioning process can be started, in which the information disc 2 is lowered with its positioning hole 3 onto holding elements 37 of a turntable (similar to 91 in FIG. 9 for another embodiment). The information disc 2 is then clamped onto the turntable by means of a clamping device (similar to 90 in FIG. 9 for another embodiment), and the information disc 2 now occupies a position, not shown and referred to hereinafter as the play position. The positioning process during loading can be as described comprehensively in (EP 273,510) hereby incorporated in whole by reference), but different positioning processes are also possible.

The ejection process now proceeds as follows. First of all, the information disc 2 is lifted from the play position into the roll-in position by means of the positioning mechanism.

The motor 24 is now started and is rotated so as to drive the rubber roller 21 counter-clockwise. The rubber roller 21, which rotates counter-clockwise, exerts a tangential force on the edge 2a of the information disc 2, as a result of which the information disc 2, which is supported between the supporting guide 9 and the rubber roller 21, is automatically rolled out of the housing along the straight loading path 45. The information disc 2 is then laterally guided by the groove 10 of the supporting guide 9 at one side and by the groove 22 of the rubber roller 21 at the other side and the pivotal arm 12 is pivoted about the spindle 13 and the pivotal arm 7 about the spindle 8. The information disc 2 is now automatically moved outward into the eject position shown in FIG. 1 and the motor 24 is switched off by the switch, not shown.

In this eject position the information disc 2 is held in a stable manner by the rubber roller 21 and the supporting guide 9 so as to prevent the information disc 2 from inadvertently rolling out of the housing 1. In this eject position the user can remove the information disc 2 by hand at the edge 3a of the positioning hole 3 and at the periphery 2a of the information disc 2.

Figure 5:
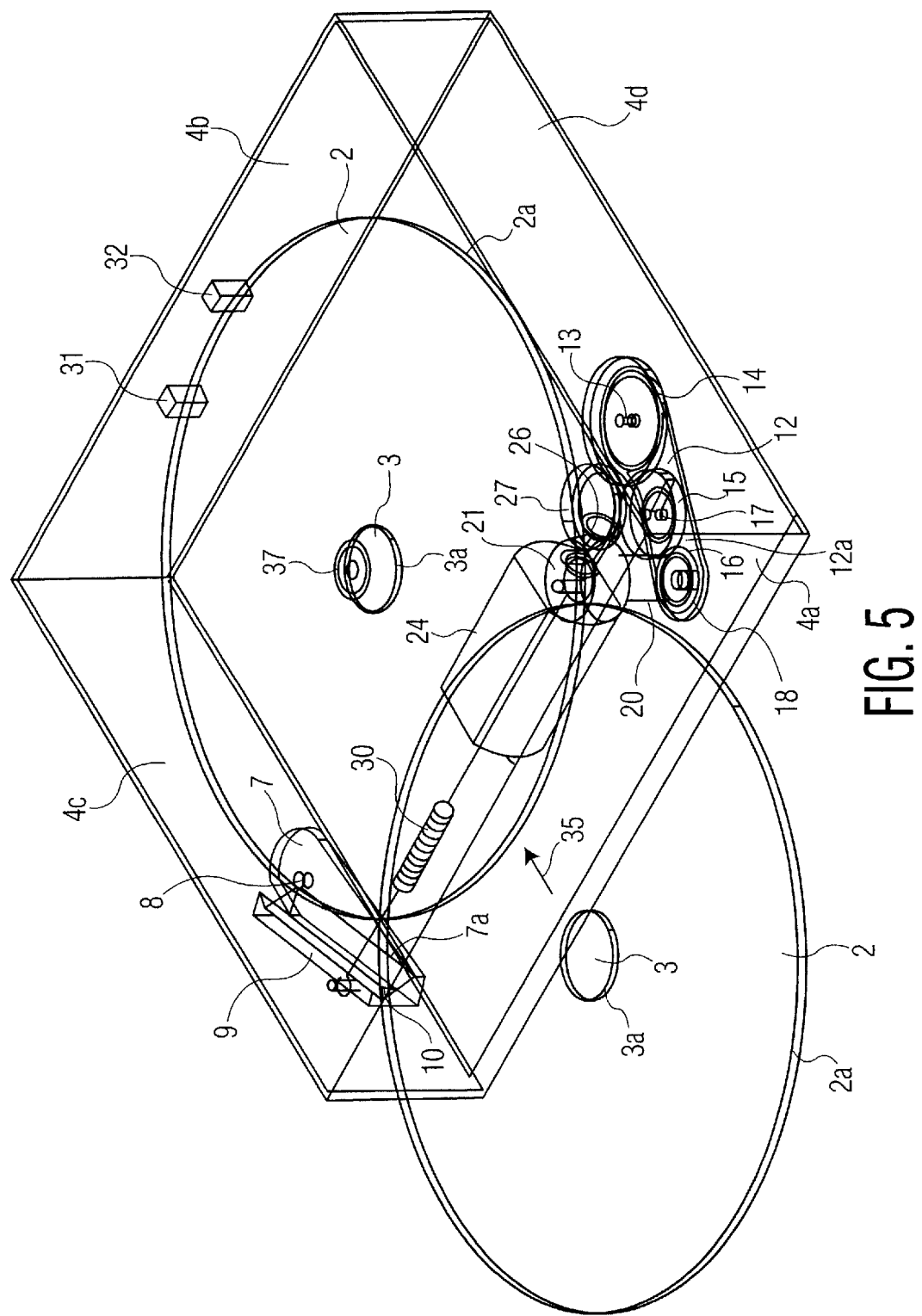
FIG. 5 is a perspective view showing the loading mechanism with the information disc in the eject position and the roll-in position.

FIG. 5 is a perspective view of the loading mechanism, the information disc 2 being shown in the eject position and the roll-in position.

Figure 6:
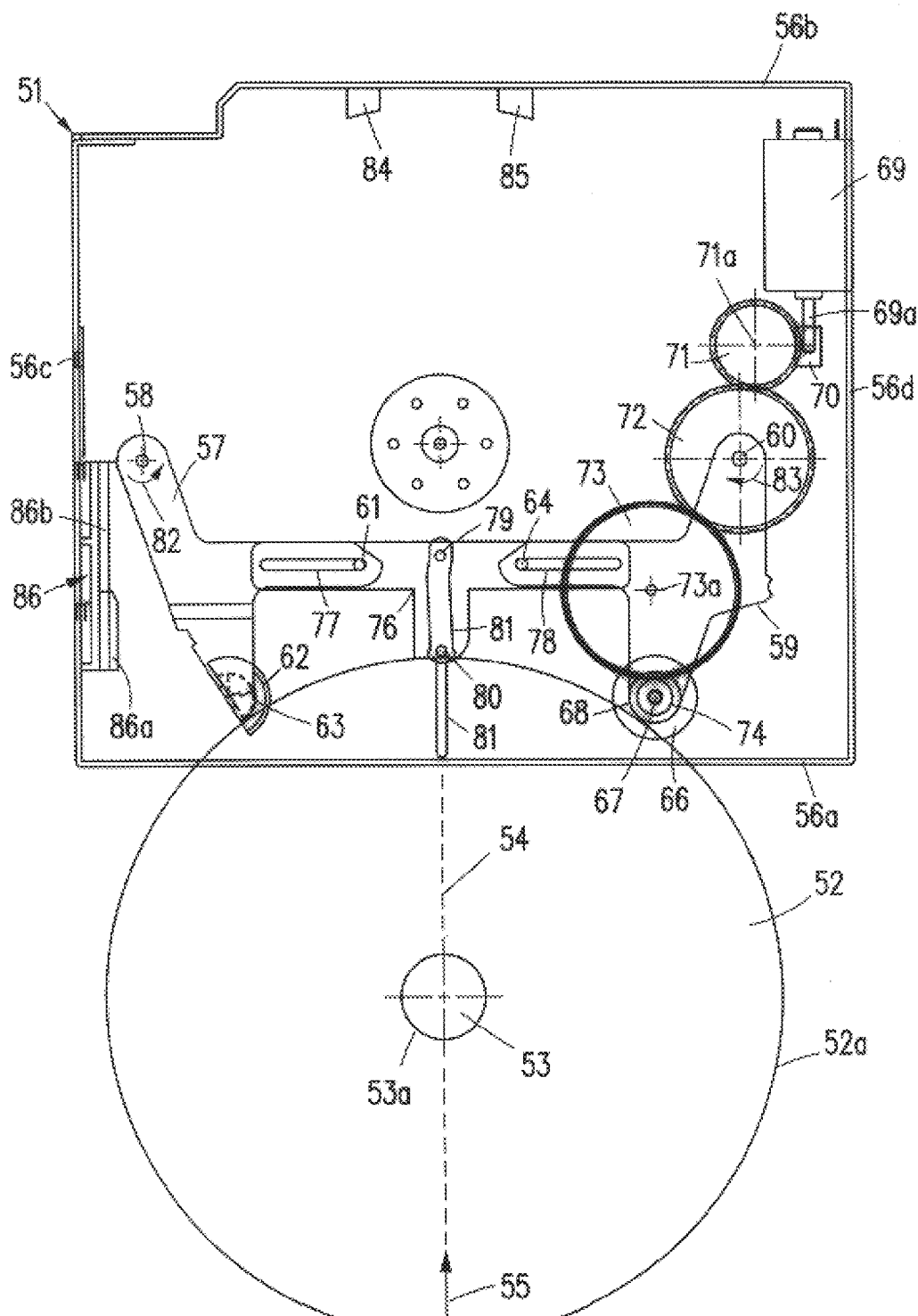
FIG. 6 shows as a second embodiment the loading mechanism of an apparatus for recording and/or reproducing information on/from an information disc in a plan view, the loading mechanism being shown in an eject position and the pivotal arms being coupled by a coupling rod.

FIG. 6 shows a second embodiment of a loading mechanism in accordance with the invention in the eject position. The loading mechanism shown in FIG. 6 is accommodated in a housing 51. The loading mechanism serves to move an information disc 52 into the housing 1 in a first loading direction 55 along a straight loading path 54 and out of the housing 1 in a direction opposite to the first loading direction 55 along the straight loading path 54. The information disc 52 has a circular edge 52a and has a circular positioning hole 53 with an edge 53a. The housing 51 has a front wall 56a, a rear wall 56b and side walls 56c and 56d, as well as a bottom plate 56e (see FIG. 9) and a housing cover 56f (see FIG. 9). A pivotal spindle 58 is mounted on the bottom plate 56e in the proximity of the side wall 56c, about which spindle a first pivotal arm 57 is pivotable. A spindle 60 is mounted on the housing bottom 56e in the proximity of the side wall 56d, about which spindle a second pivotal arm 59 is pivotable. The first pivotal arm 57 carries a pivotal-arm pin 61 and a supporting guide 62 having a groove 63. The second pivotal arm 59 carries a transport wheel 66 which is rotatable about a spindle 67. The transport wheel 66 has a groove 68. A motor 69, whose shaft 69a carries a worm 70, is mounted on the bottom plate 56e of the housing 51. The motor 69 can be driven in two directions. By means of the worm 70 a toothed wheel 71 can be driven, which toothed wheel is rotatable about a spindle 71a carried by the bottom plate 56e. The toothed wheel 71 is in mesh with a toothed wheel 72, which is rotatable about the pivotal spindle 60 of the second pivotal arm 59. The second toothed wheel 72 is in mesh with a third toothed wheel 73, which is rotatable about a spindle 73a carried by the second pivotal arm 59. The third toothed wheel 73 meshes with a toothed ring 74 arranged on the transport wheel 66. Thus, the transport wheel 66 can be driven in two directions by means of the motor 69, the motor shaft 69a, the worm 70, the first toothed wheel 71, the second toothed wheel 72, the third toothed wheel 73 and toothed ring 74 on the transport wheel.

A T-shaped coupling rod 76 has a first coupling-rod groove 77, which extends perpendicularly to the first loading direction 55, a second coupling-rod groove 78, which extends perpendicularly to the first loading direction 55, a first coupling-rod pin 79 and a second coupling-rod pin 80. The first coupling-rod pin 79 and the second coupling-rod pin 80 engage a housing-cover groove 81 formed in the housing cover 56f and extending in the first loading direction 55. The pivotal-arm pin 61 of the first pivotal arm 57 engages the first coupling-rod groove 77 and the pivotal-arm pin 64 of the second pivotal arm 59 engages the second coupling-rod groove 78.

The first pivotal arm 57 is pretensioned in the direction indicated by an arrow 82 about the pivotal spindle 58 by means of a spring, not shown. The second pivotal arm 59 is pretensioned in the direction indicated by an arrow 83 about the pivotal spindle 60 by means of a spring, not shown. It is also possible to pretension only one of the two pivotal arms.

The rear wall 56b of the housing 51 carries two stops 84 and 85.

The side wall 56c of the housing 51 carries an auxiliary guide 86. This auxiliary guide 86 has a lower supporting surface 86a, which extends in a loading plane 75, and an upper guide surface 86b, which extends in the loading plane 75. The upper guide surface 86b is longer than the lower supporting surface 86a in the first loading direction 55.

In the eject position shown in FIG. 6 the user has brought the information disc 52 by hand into engagement with the groove 63 of the supporting guide 62 and the groove 68 of the transport wheel 66. For this purpose, the user holds the information disc 52 by the edge 52a of the disc 52 and by the edge 53a of the positioning hole 53. The information disc 52 thus held is moved from the eject position shown in FIG. 6 into the intermediate position shown in FIG. 7. During this movement from the eject position shown in FIG. 6 into the intermediate position shown in FIG. 7 the first pivotal arm 57 is pivoted about the spindle 58 and the second pivotal arm 59 is pivoted about the spindle 60. The pivoting force required for this is exercised by the user. The information disc 52 is then laterally guided by the groove 63 of the supporting guide 62 at one side and by the groove 68 of the transport wheel 66 at the other side. The user does not touch the surface of the information disc 52.

Figure 7:
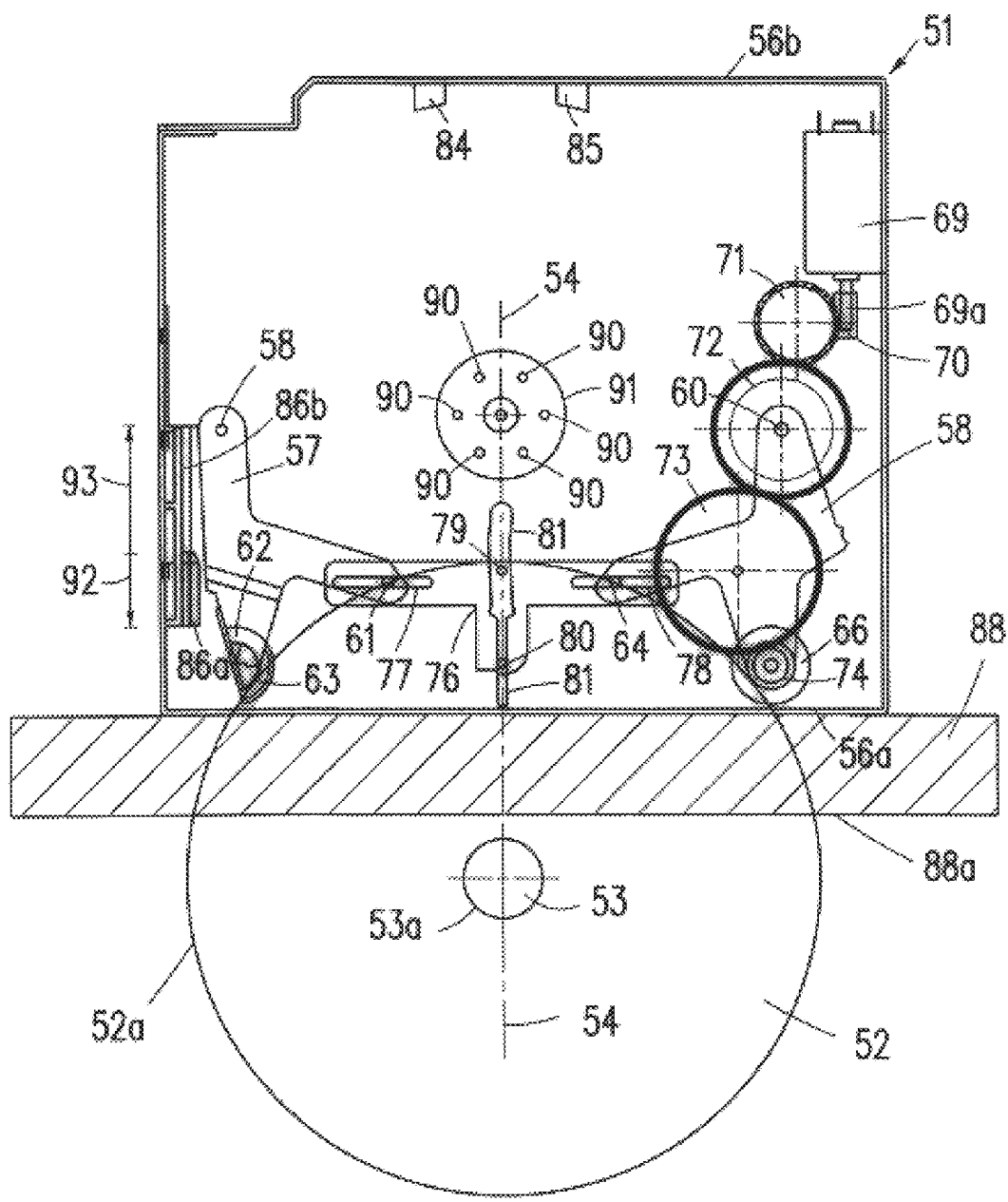
FIG. 7 shows the loading mechanism of FIG. 6 in an intermediate position in which the user has inserted the information disc up to a point at which the loading mechanism automatically takes over the further insertion of the information disc.

In the intermediate position of the loading mechanism shown in FIG. 7 the information disc 52 projects from the front 56a of the housing 51 over approximately ⅔ of its diameter. As is shown in FIG. 7, it is possible to mount a control panel 88 on the front wall 56a of the housing 51. This control panel 88 can be, for example, the control panel of a car radio which incorporates an apparatus for recording and/or reproducing information on/from the information disc 52. The positioning hole 53 of the information disc 52 projects from the front side 88a of the control panel 88. Consequently, the user can also hold the information disc 52 by the edge 53a of the positioning hole 53 and by the edge 52a of the information disc 52 in this intermediate position.

When the user has inserted the information disc 52 by hand into the housing 51 up to the intermediate position, the motor 69 is energized via a switch, not shown, and the loading mechanism automatically completes the loading process.

The switch can be, for example, a mechanical switch or an optical switch (light barrier). It is also possible to start the motor at an earlier instant.

The motor 69 now begins to rotate so as to drive the transport wheel 66 clockwise via the motor shaft 69a, the worm 70, the first toothed wheel 71, the second toothed wheel 72, the third toothed wheel 73 and toothed ring 74 on the transport wheel. The transport wheel 66, which rotates clockwise, then exerts a tangential force on the edge 52a of the information disc 52, as a result of which the information disc 52, which is supported between the supporting guide 62 and the transport wheel 66, is automatically rolled into the housing 51 along a straight loading path 54. The first pivotal arm 57 is then pivoted about the spindle 58 and the second pivotal arm 59 about the spindle 60.

Figure 8:
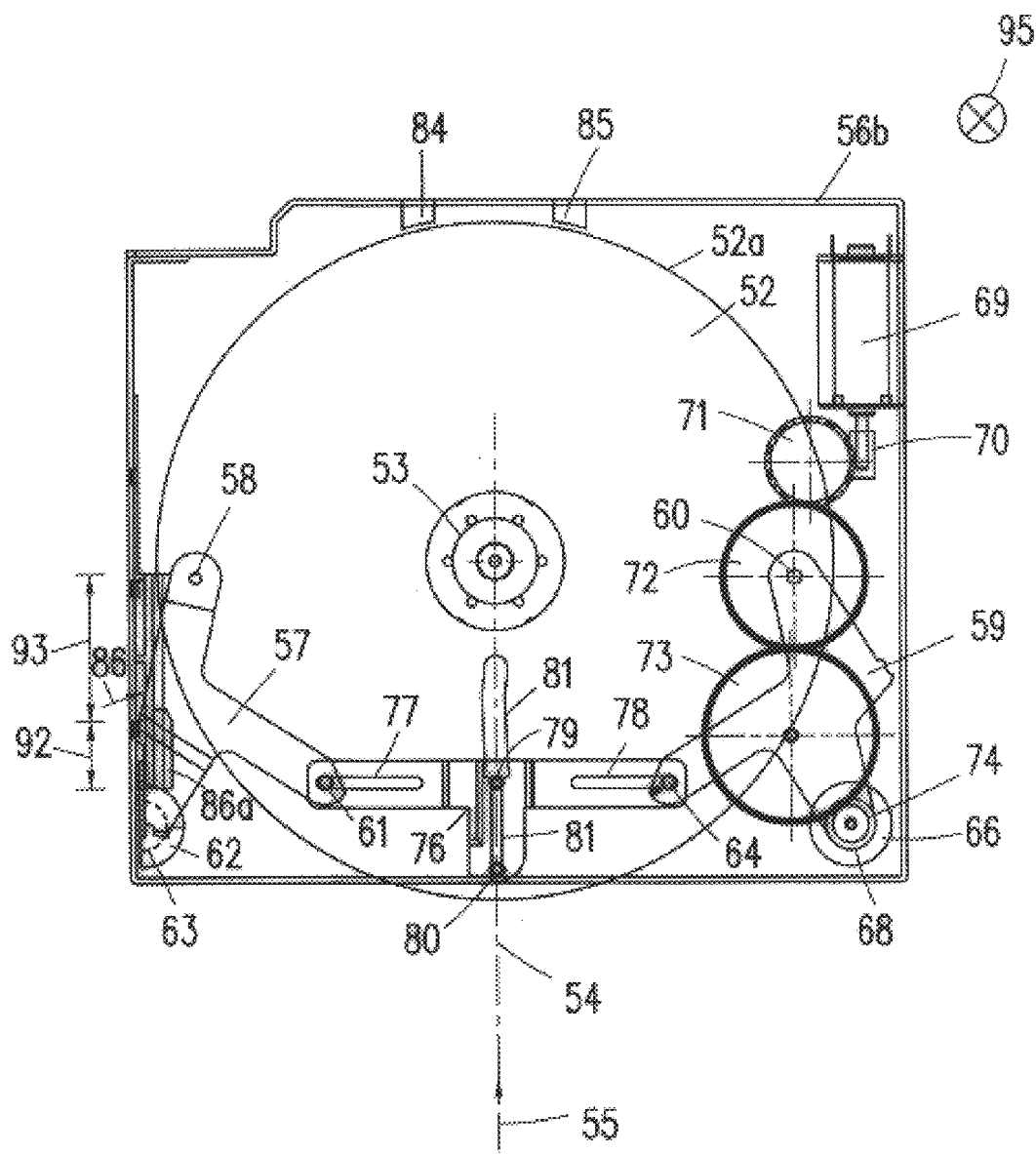
FIG. 8 shows the loading mechanism of FIG. 6 in a roll-in position with an information disc wholly rolled-in in the first loading direction, the guides arranged on the pivotal arms being pivoted away from the disc edge to allow the information disc to be lowered onto a turntable by means of a lowering mechanism, not shown.

FIG. 8 shows the loading mechanism in a roll-in position, in which the information disc 52 has been moved up to the stops 84 and 85 in the first loading direction 55. The pivotal arms 57 and 59 have been pivoted away from the disc edge 52a with the transport wheel 66 and the supporting guide 62 and the lower supporting surface 86a of the auxiliary guide 86 no longer acts upon the information disc 52, so that by means of a lowering mechanism, not shown, this information disc can be lowered with its positioning hole 53 onto a clamping device 90 of a turntable 91 shown in FIG. 9 into a play position, not shown. In this play position, not shown, the information disc 52 can be rotated by means of the turntable 91, which is drivable by drive means 96 shown in FIG. 9, and the information stored on the information disc 52, for example music information, can be reproduced.

The transfer from the intermediate position shown in FIG. 7 to the roll-in position shown in FIG. 8 will be described in detail hereinafter.

The transport wheel 66, which rotates clockwise, exerts a tangential force on the edge 52a of the information disc 52, as a result of which the information disc 52, which is supported between the supporting guide 62 and the transport wheel 66, is rolled into the housing 51 along a straight loading path 54 in the first loading direction 55.

During the movement from the intermediate position to the play position the edge 52a of the information disc 52 is partly guided by the auxiliary guide 86, which as a third guide in addition to the supporting guide 62 and the transport wheel 66 forming the loading guide which ensures a better guidance of the information disc 52.

In a first part 92 of the auxiliary guide 86, indicated in FIGS. 7 and 8, the edge of the information disc 52 is then guided both by the lower supporting surface 86a of the auxiliary guide 86 and by the upper guide surface 86b of the auxiliary guide 86. In a second part 93 of the auxiliary guide 86 the information disc 52 is guided only by the upper guide surface 86b of the auxiliary guide 86. During the movement of the information disc 52 in the first loading direction 55 rolling-in along the straight loading path 54 is achieved in that the first coupling-rod pin 79 and the second coupling-rod pin 80 are guided in the first loading direction 55 in the housing-cover groove 81. The loading process in the first loading direction 55 is terminated in that the information disc 52 abuts against stops 84 and 85 on the rear wall 56b of the housing 51. Once the information disc 52 has been moved against the stops 84 and 85 in the first loading direction 55, a drive mechanism, not shown, is activated in a manner, not shown, which mechanism acts upon the first pivotal arm 57 in such a manner that this arm is pivoted clockwise about the pivotal spindle 58 and upon the second pivotal arm 59 in such a manner that this arm is pivoted counter-clockwise about the spindle 60.

As a result, the groove 68 of the transport wheel 66 and the groove 63 of the supporting guide 62 are disengaged from the edge 52a of the information disc 52. In this position the information disc 52 is no longer guided by the lower supporting surface 86a of the auxiliary guide 86. This enables the information disc 52 as shown in FIG. 9 to be lowered onto the clamping device 90 of the turntable 91 in a manner, not shown, by a lowering mechanism, not shown, in a second loading direction 95 perpendicular to the loading plane 75. The unloading process is exactly the inverse of the loading process.

FIG. 9 shows the loading mechanism in the roll-in position of FIG. 8 in a front view at the front wall 56a of the housing 51. The turntable 91 can be driven by means of a disc-drive motor 96, so that the information disc 52, when it has been clamped onto the clamping device 90 of the turntable 91 with its positioning hole 53, can also be rotated by means of the disc-drive motor 96.

Figure 10:
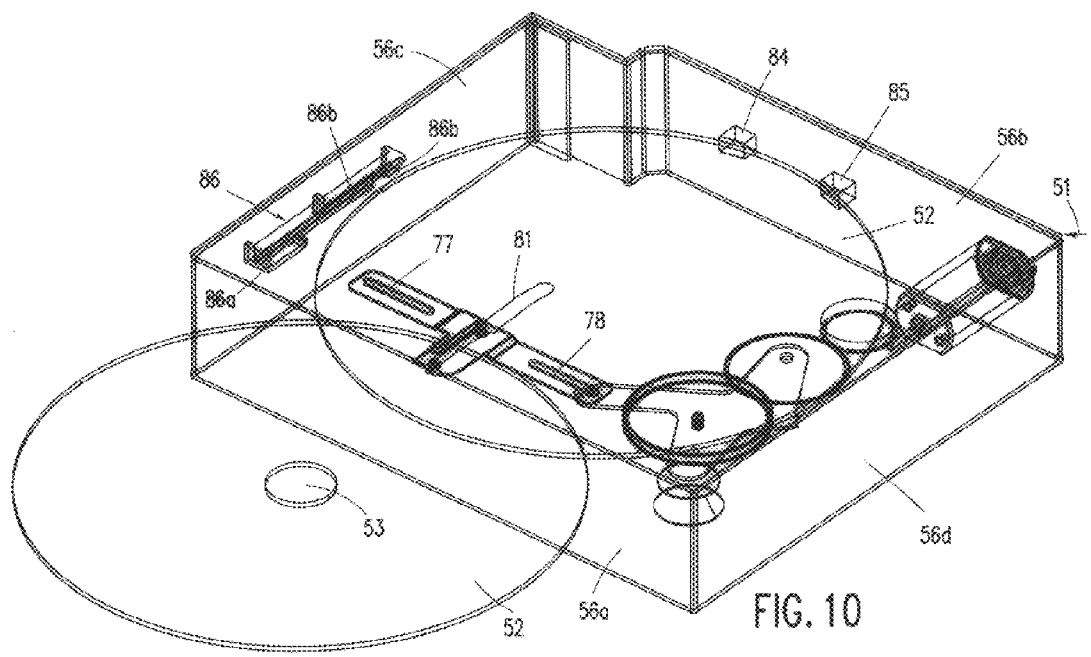
FIG. 10 is a perspective view showing the loading mechanism with the information disc in the eject position and the roll-in position, a supporting guide not being shown to illustrate the construction of an auxiliary guide more clearly.

FIG. 10 shows the loading mechanism in a perspective view with the information disc 52 in the eject position and in the roll-in position. The first pivotal arm 57 is not shown to illustrate the construction of the auxiliary guide 86 with the lower supporting surface 86a and the upper guide surface 86b more clearly.

Figure 11:
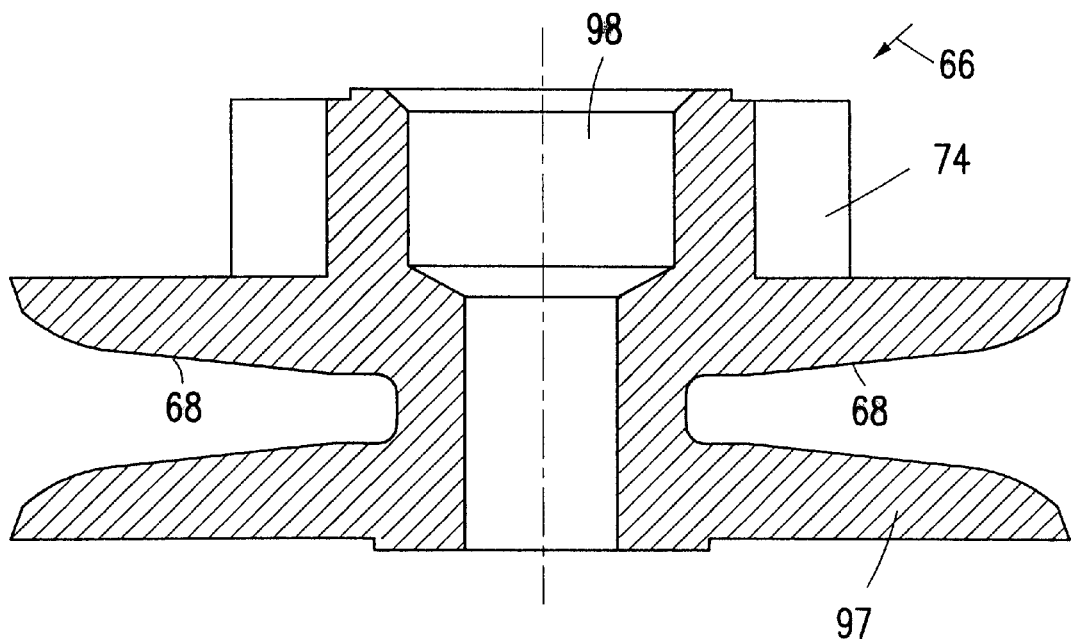
FIG. 11 is a sectional view of a transport wheel.

FIG. 11 is a sectional view of an example of the transport wheel 66. The transport wheel 66 comprises a rubber body 97 in which the groove 68 of the transport wheel 66 has been formed. The rubber body 97 surrounds a spindle 98, which may for example consist of a metal or a plastic.

The rubber body 97 further has a toothed ring 74, which has for example been pressed onto the rubber body 97 or which has for example been secured to the spindle 98, thereby enabling the transport wheel 66 to be rotated by a toothed wheel, not shown in FIG. 11, which toothed wheel meshes with the toothed ring 74.

Figure 12:
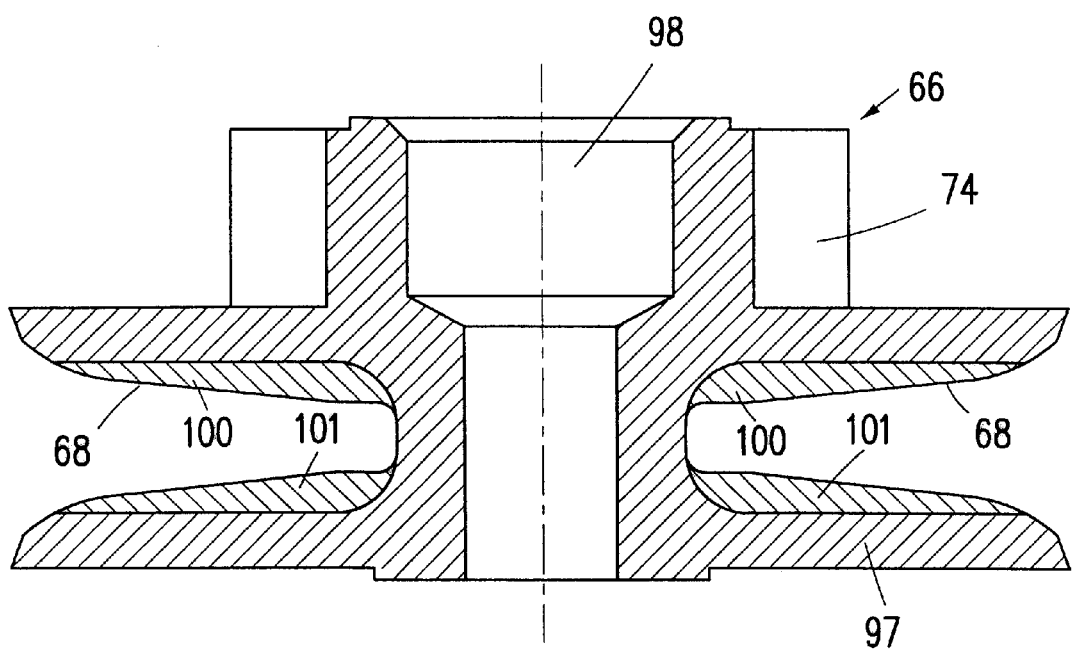
FIG. 12 is a sectional view of another example of the transport wheel.

FIG. 12 shows a slightly different construction of the transport wheel 66 of FIG. 11. The rubber body 97 of the transport wheel 66 has two oil-filled oil chambers 100 and 101 adjoining the groove 68.

When an information disc not shown in FIG. 12 is inserted into the grooves 68, the oil chambers 100 and 101 of the rubber body 97 can engage with the disc edge. This enables larger forces for holding the information disc to be applied.

Figure 13:
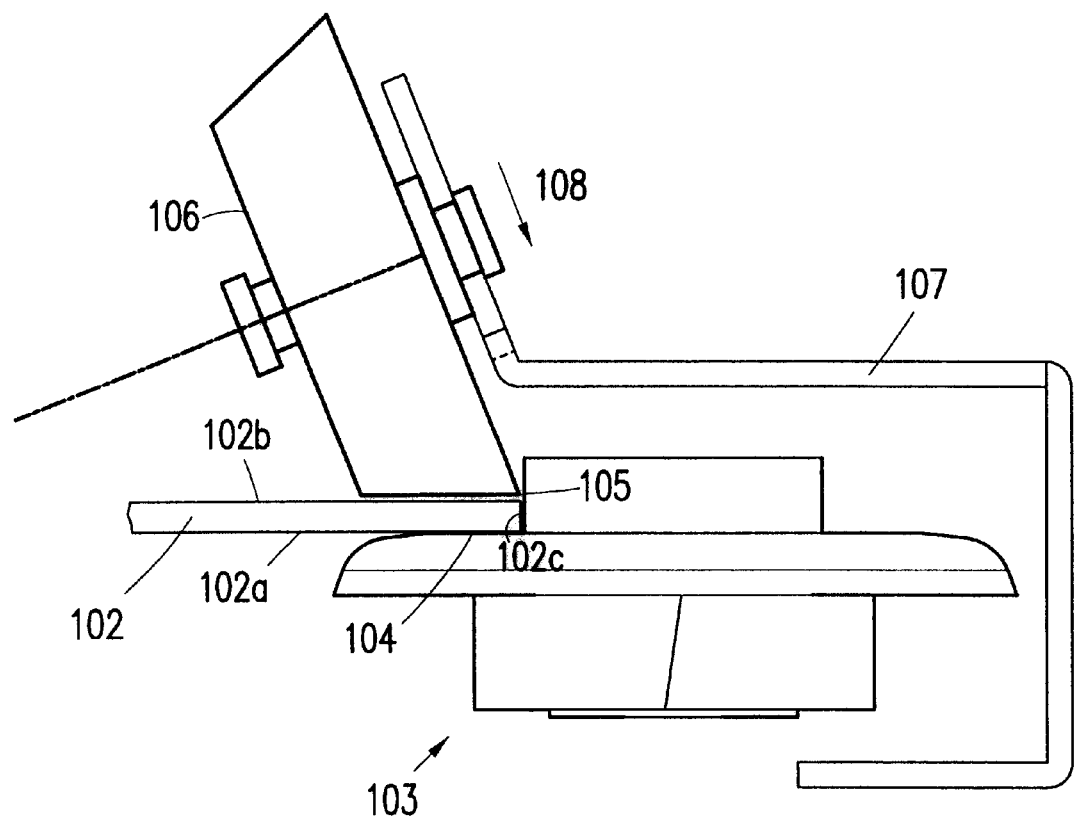
FIG. 13 is a side view of a further example of the transport wheel.

FIG. 13 shows a transport wheel 103 having a supporting surface 104, which supports the surface 102a of an information disc 102. The transport wheel 103 has a contact edge 105 against which the edge 102c of the information disc 102 bears. A pressure element 106 has been provided, which is mounted on a member 107 so as to be movable in the direction indicated by an arrow 108. The pressure element 106 is pretensioned relative to the member 107 in the direction indicated by the arrow 108. As a result of this pretension, which can for example be obtained by means of a spring not shown, the pressure surface 106a of the pressure element 106 is pressed against the surface 102b of the information disc 102.

By means of such a construction a larger clamping force can be exerted on the information disc 102 than is possible by means of a groove 68 of the transport wheel 66 as shown in FIGS. 11 and 12. Such a larger clamping force is of particular importance in the eject position. Obviously, it is also possible to use the construction shown in FIG. 13 for the supporting guide 62.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention.

Thus, the scope of the invention is only limited by the following claims:

1. A loading mechanism for a disc, comprising:
    support means with a support surface for supporting a first position on an edge of the disc pressed against the support surface; and
    drive means including a transport wheel that is drivable with a second position of the disc edge pressed against the transport wheel for rolling the disc along the support surface for loading and unloading the disc;
    the support means further include an edge of the support surface pressed against the first position on the edge of the disc in an eject position of the disc and about which the disc rotates as the disc is loaded until the disc begins to roll on the support surface;
    the first position on the disc edge and the second position on the disc edge being different positions;
    the support surface and the transport wheel guiding the disc along a loading path;
    the support surface and the transport wheel each being movable with respect to the loading path in a plane of the disc during loading and unloading; and
    at least a component of the direction of the movement of the support surface being perpendicular to the transport path.

2. The loading mechanism of claim 1, in which the support surface and the transport wheel are each biased toward the loading path.

3. The loading mechanism of claim 1, in which the loading path is rectilinear.

4. The loading mechanism of claim 1, in which the support surface and the transport wheel are each carried by respective pivotal arms which are supported at respective pivoting ends.

5. The loading mechanism of claim 4, in which the pivotal arms are biased to pivot towards the loading path.

6. The loading mechanism of claim 1, in which the pivotal arms are coupled to one another.

7. The loading mechanism of claim 6, in which the coupling includes a tension spring acting between the two pivotal arms.

8. The loading mechanism of claim 7, in which the coupling includes a rod with each end of the rod coupled to a respective pivotal arm.

9. The loading mechanism of claim 8, in which the coupling rod has at least two longitudinal grooves which are each engaged by a pivotal-arm pin mounted on each respective pivotal arm, and the coupling rod has at least one coupling-rod pin which engages a groove in a housing-cover which extends in the housing cover in the direction of the loading path.

10. The loading mechanism of claim 1, in which the edge of the support surface has a groove in which the edge of the information disc engages.

11. The loading mechanism of claim 1, in which the support means includes a groove in which the edge of the information disc engages.

12. The loading mechanism of claim 1, in which a point on the edge of the support surface against which the first position of the disc edge is pressed as the disc rotates about the first position, is in the end of a groove in the support surface.

13. The loading mechanism of claim 1, further comprising auxiliary guide means for guiding the disc edge in an intermediate stage of the loading process, the auxiliary guide being in addition to the support surface and the transport wheel.

14. The loading mechanism of claim 13, in which the auxiliary guide means includes a groove in which the edge of the information disc engages.

15. The loading mechanism of claim 1, in which the support means and the loading means exert pressure on the disc edge in an eject position and hold the information disc in a stable manner in this eject position so as to prevent the information disc from rolling out the apparatus and allow the user to remove the information disc in the eject position by hand in such a manner that the hand of the user only touches the information disc at the inner edge of the positioning hole of the information disc and at the peripheral edge of the information disc.

16. The loading mechanism of claim 1, in which in an intermediate position, in which the information disc is inserted by the user and from which the loading mechanism automatically rolls the information disc into the apparatus, a positioning hole of the information disc is positioned to enable the user to insert the information disc by hand in such a manner that the hand of the user only touches the information disc at the inner edge of the positioning hole of the information disc and at the peripheral edge of the information disc.

17. The mechanism of claim 1, in which:
    the support surface and the transport wheel are each biased toward the loading path;
    the loading path is rectilinear;
    the support surface and the transport wheel are each carried by respective pivotal arms which are supported at respective pivoting ends;
    the pivotal arms are biased to pivot towards the loading path;
    the pivotal arms are coupled to one another;
    the coupling includes a tension spring acting between the two pivotal arms;
    the coupling includes a rod with each end of the rod coupled to a respective pivotal arm;
    the coupling rod has at least two longitudinal grooves which are each engaged by a pivotal-arm pin mounted on each respective pivotal arm, and the coupling rod has at least one coupling-rod p engages a groove in a housing-cover which extends in the housing cover in the direction of the loading path;
    the transport wheel has a groove in which the edge of the information disc engages;
    the support means includes a groove in which the edge of the information disc engages;

the edge of the support surface has a groove in which the edge of the information disc engages;

the mechanism further comprising auxiliary guide means for guiding the disc edge in an intermediate stage of the loading process, the auxiliary guide being in addition to the support surface and the transport wheel;

the auxiliary guide means includes a groove in which the edge of the information disc engages;

the support means and the loading means exert pressure on the disc edge in an eject position and hold the information disc in a stable manner in this eject position so as to prevent the information disc from rolling out the apparatus and allow the user to remove the information disc in the eject position by hand in such a manner that the hand of the user only touches the information disc at the inner edge of the positioning hole of the information disc and at the peripheral edge of the information disc; and in an intermediate position, the information disc is inserted by the user and from which the loading mechanism automatically rolls the information disc into the apparatus, a positioning hole of the information disc is positioned to enable the user to insert the information disc by hand in such a manner that the hand of the user only touches the information disc at the inner edge of the positioning hole of the information disc and at the peripheral edge of the information disc.

18. A deck for reproducing information from a disc, comprising:

a housing with a slot into which discs are loaded and unloaded;

support means with a support surface for supporting a first position on an edge of the disc in the slot pressed against the support surface; and drive means including a transport wheel that is drivable with a second position of the disc edge pressed against the transport wheel for rolling the disc along the support surface for loading and unloading the disc;

the support means further include an edge of the support surface pressed against the first position on the edge of the disc in an eject position of the disc and about which the disc rotates as the disc is loaded until the disc begins to roll on the support surface;

the first position on the disc edge and the second position on the disc edge being different positions;

the support surface and the transport wheel guiding the disc along a loading path between an eject position and a playing position;

the support surface and the transport wheel each being movable with respect to the loading path in a plane of the disc during loading and unloading;

at least a component of the direction of the movement of the support surface being perpendicular to the transport path;

a turntable for supporting the disc in a play position;

means for clamping the disc to the turntable; and means to spin the turntable to spin the disc in the play position.

19. The deck of claim 18, in which:

the support surface and the transport wheel are each biased toward the loading path;

the loading path is rectilinear;

the support surface and the transport wheel are each carried by respective pivotal arms which are supported at respective pivoting ends;

the pivotal arms are biased to pivot towards the loading path;

the pivotal arms are coupled to one another;

the coupling includes a tension spring acting between the two pivotal arms;

the coupling includes a rod with each end of the rod coupled to a respective pivotal arm;

the coupling rod has at least two longitudinal grooves which are each engaged by a pivotal-arm pin mounted on each respective pivotal arm, and the coupling rod has at least one coupling-rod p engages a groove in a housing-cover which extends in the housing cover in the direction of the loading path;

the transport wheel has a groove in which the edge of the information disc engages;

the support means includes a groove in which the edge of the information disc engages;

the edge of the support surface has a groove in which the edge of the information disc engages;

the mechanism further comprising auxiliary guide means for guiding the disc edge in an intermediate stage of the loading process, the auxiliary guide being in addition to the support surface and the transport wheel;

the auxiliary guide means includes a groove in which the edge of the information disc engages;

the support means and the loading means exert pressure on the disc edge in an eject position and hold the information disc in a stable manner in this eject position so as to prevent the information disc from rolling out the apparatus and allow the user to remove the information disc in the eject position by hand in such a manner that the hand of the user only touches the information disc at the inner edge of the positioning hole of the information disc and at the peripheral edge of the information disc; and in an intermediate position, the information disc is inserted by the user and from which the loading mechanism automatically rolls the information disc into the apparatus, a positioning hole of the information disc is positioned to enable the user to insert the information disc by hand in such a manner that the hand of the user only touches the information disc at the inner edge of the positioning hole of the information disc and at the peripheral edge of the information disc.

20. Apparatus for recording and/or reproducing information on/from an information disc, comprising:

a housing with a slot into which discs are loaded and unloaded;

a control panel on the outside of the housing for controlling the recording and/or reproduction of information;

support means with a support surface for supporting a first position on an edge of the disc in the slot pressed against the support surface;

drive means including a transport wheel that is drivable with a second position of the disc edge pressed against the transport wheel for rolling the disc along the support surface for loading and unloading the disc;

the support means further include an edge of the support surface pressed against the first position on the edge of the disc in an eject position of the disc and about which the disc rotates as the disc is loaded until the disc begins to roll on the support surface;

the first position on the disc edge and the second position on the disc edge being different positions;

the support surface and the transport wheel guiding the disc along a loading path between an eject position and a playing position;

the support surface and the transport wheel each being movable with respect to the loading path in a plane of the disc during loading and unloading;

at least a component of the direction of the movement of the support surface being perpendicular to the transport path;

a turntable for supporting the disc in a play position;

means for clamping the disc to the turntable;

means to spin the turntable to spin the disc in the play position; and means for recording and/or reproducing information on/from the spinning disc.

21. The deck of claim 20, in which:

the support surface and the transport wheel are each biased toward the loading path;

the loading path is rectilinear;

the support surface and the transport wheel are each carried by respective pivotal arms which are supported at respective pivoting ends;

the pivotal arms are biased to pivot towards the loading path;

the pivotal arms are coupled to one another;

the coupling includes a tension spring acting between the two pivotal arms;

the coupling includes a rod with each end of the rod coupled to a respective pivotal arm;

the coupling rod has at least two longitudinal grooves which are each engaged by a pivotal-arm pin mounted on each respective pivotal arm, and the coupling rod has at least one coupling-rod p engages a groove in a housing-cover which extends in the housing cover in the direction of the loading path;

the transport wheel has a groove in which the edge of the information disc engages;

the support means includes a groove in which the edge of the information disc engages;

the edge of the support surface has a groove in which the edge of the information disc engages;

the mechanism further comprising auxiliary guide means for guiding the disc edge in an intermediate stage of the loading process, the auxiliary guide being in addition to the support surface and the transport wheel;

the auxiliary guide means includes a groove in which the edge of the information disc engages;

the support means and the loading means exert pressure on the disc edge in an eject position and hold the information disc in a stable manner in this eject position so as to prevent the information disc from rolling out the apparatus and allow the user to remove the information disc in the eject position by hand in such a manner that the hand of the user only touches the information disc at the inner edge of the positioning hole of the information disc and at the peripheral edge of the information disc; and in an intermediate position, the information disc is inserted by the user and from which the loading mechanism automatically rolls the information disc into the apparatus, a positioning hole of the information disc is positioned to enable the user to insert the information disc by hand in such a manner that the hand of the user only touches the information disc at the inner edge of the positioning hole of the information disc and at the peripheral edge of the information disc.

* * * * *